(12) United States Patent
Maeda et al.

(10) Patent No.: US 7,069,947 B2
(45) Date of Patent: Jul. 4, 2006

(54) FLUID CONTROL VALVE

(75) Inventors: Kazuhiko Maeda, Anjo (JP); Shigeki Niimi, Kariya (JP); Kazuhiro Matsukawa, Nishio (JP); Hiroshi Isogai, Nishio (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 219 days.

(21) Appl. No.: 10/785,049

(22) Filed: Feb. 25, 2004

(65) Prior Publication Data

US 2004/0182450 A1    Sep. 23, 2004

(30) Foreign Application Priority Data

Feb. 25, 2003    (JP) .............................. 2003-047820

(51) Int. Cl.
 *E03B 3/18*    (2006.01)
(52) U.S. Cl. ..................... 137/549; 137/545; 137/547
(58) Field of Classification Search ................ 137/545, 137/547, 549
See application file for complete search history.

(56) References Cited

U.S. PATENT DOCUMENTS

| | | | | |
|---|---|---|---|---|
| 3,006,371 A | * | 10/1961 | Giles | 137/550 |
| 4,832,077 A | * | 5/1989 | Pilolla | 137/549 |
| RE33,135 E | * | 12/1989 | Wanner et al. | 417/377 |
| 5,062,454 A | * | 11/1991 | Ichihashi et al. | 137/625.61 |
| 6,637,457 B1 | * | 10/2003 | Evanovich et al. | 137/574 |
| 6,648,014 B1 | * | 11/2003 | Takahashi et al. | 137/545 |
| 6,848,404 B1 | * | 2/2005 | Maeyama et al. | 123/90.17 |

FOREIGN PATENT DOCUMENTS

JP    06336978    7/1993

* cited by examiner

*Primary Examiner*—A. Michael Chambers
(74) *Attorney, Agent, or Firm*—Reed Smith LLP; Stanley P. Fisher, Esq.; Juan Carlos A. Marquez, Esq.

(57) ABSTRACT

A fluid control valve includes a valve body, an annular groove portion formed in an outer periphery of the valve body, a filter provided in the groove portion. The filter includes a plate with a plural of perforations and formed into a cylindrical shape. The filter further includes a snap ring formed from a thin bar bent into a loop. Both ends of the snap ring extending in an axial direction and freely contacting with opposed side surfaces defining the groove portion.

7 Claims, 5 Drawing Sheets

FLUID CONTROL VALVE

CROSS REFERENCE TO RELATED APPLICATIONS

This application is based on and claims priority under 35 U.S.C. § 119 with respect to Japanese Patent Application 2003-047820, filed on Feb. 25, 2003, the entire content of which is incorporated herein by reference.

FIELD OF THE INVENTION

This invention generally relates to a control valve, more particularly to a fluid control valve provided with fluid control circuit.

BACK GROUND OF THE INVENTION

A conventional control valve includes a Spool which is slidably disposed at a central hole of a housing with an inlet port and an outlet port by actuation of an electromagnet. The conventional control valve includes a port formed in a valve body in a radial direction and a passage formed in an axial direction. The port and the passage selectively communicate with the inlet port and the outlet port for moving the spool. As the result, fluid flow is controlled.

Filters are arranged in each port for communicating with the passage of the spool of such control valve. An example of the filter is disclosed in Japanese Patent Laid-Open Publication No. 6(1994)-336978.

The filter disclosed in the Publication includes a ring-shaped main body with an S-shaped joint portion made of synthetic resin, a plural windows which is formed on the side surface of the ring-shaped main body and a net portion is held taut in each window. The filter is disposed in an outer periphery of the valve body from an outside of the valve body and the filter is placed in an annular groove portion communicating with each port by widening the joint portion, and fluid flows through the net portion. Placing the filter in the annular groove prevents the filter from slidable contact with an inside surface of a central hole of the housing.

The filter described above includes the synthetic resin made and ring-shaped main body with the window. The main body needs molding in this structure, therefore the cost of processing is increased.

In addition, the joint portion of the main body is constructed to be in engagement with a hook in order to prevent widening thereof during use. As the result, placing the filter in the groove of the valve body is complex and man-hour for assembly is increased.

A need thus exists for providing an improved fluid control valve which satisfies the needs described above

SUMARRY OF THE INVENTION

A fluid control valve includes a valve body, an annular groove portion formed in an outer periphery of the valve body, a filter provided in the groove portion. The filter includes a plate with a plural of perforations and formed into a cylindrical shape. The filter further includes a snap ring formed from a thin bar bent into a loop. Both ends of the snap ring extending in an axial direction and freely contacting with opposed side surfaces defining the groove portion.

BRIEF DISCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Figure 1:
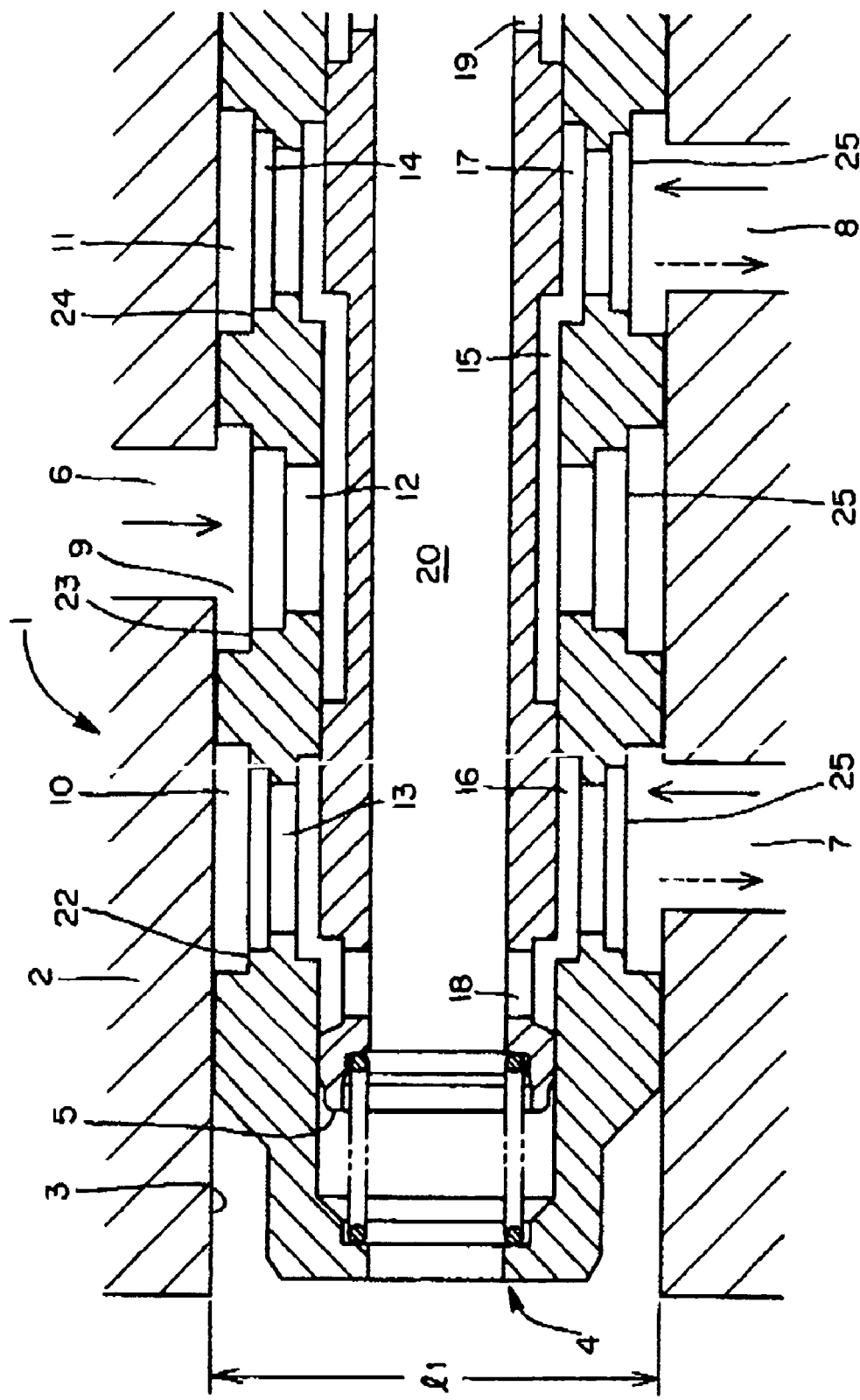
FIG. 1 is a partial cross sectional view illustrating an embodiment of a control valve of the present invention.

As shown in FIG. 1, a control valve 1 includes a valve body 4 which is disposed in a central hole 3 of a housing 2, and a spool 5 which is slidably disposed in the central hole of the valve body 4 in axial direction.

The housing 2 is provided with an oil inlet port 6 and a plural of oil outlet ports 7 and 8. Each outlet port can be used as an inlet port, and on the contrary, the inlet port can be used as an outlet port.

The valve body 4 includes annular groove portions 9,10 and 11. Each groove portion 9, 10 and 11 communicates with a plural ports 12, 13 and 14, respectively. The port 12 is faced to an annular oil passage 15 provided on an outer periphery of the spool 5. The ports 12 and 14 communicate with annular oil passages 16 and 17 formed in an inside surface of the valve body 4. The oil passages 16 and 17 can communicate with an oil passage 20 in the axial direction via oil passages 18 and 19 formed in a radial direction.

Figure 2:
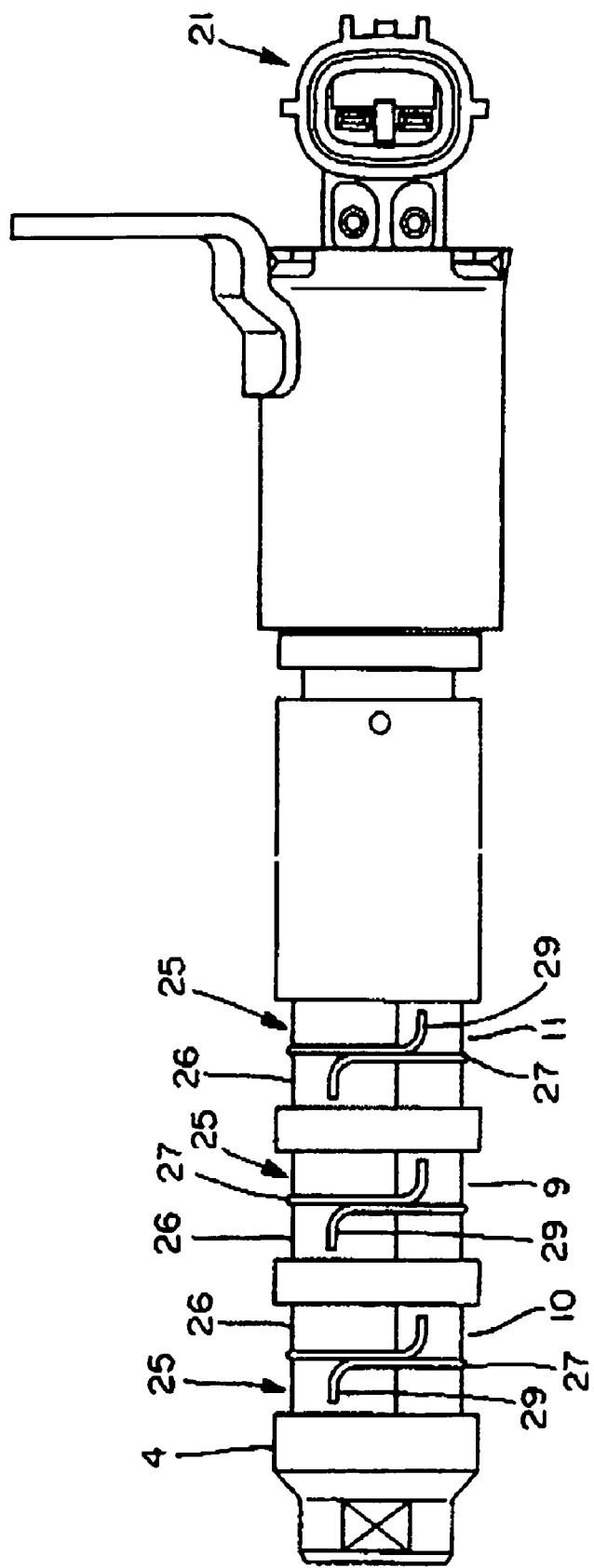
FIG. 2 is a front view illustrating a condition of a filter placed in the control valve.

The spool 5 can reciprocally move in axial direction by an electromagnet 21 shown in FIG. 2. In response to the movement of the spool 5, flow direction of fluid is shifted to control the fluid flow.

The groove portion 9, 10 and 11 include step portions 22, 23 and 24. Each step portion 22, 23 and 24 is provided with a cylindrical filter 25.

Figure 5:
FIG. 5 is a front plane view illustrating a plate for forming into a cylindrical body.
Figure 6:
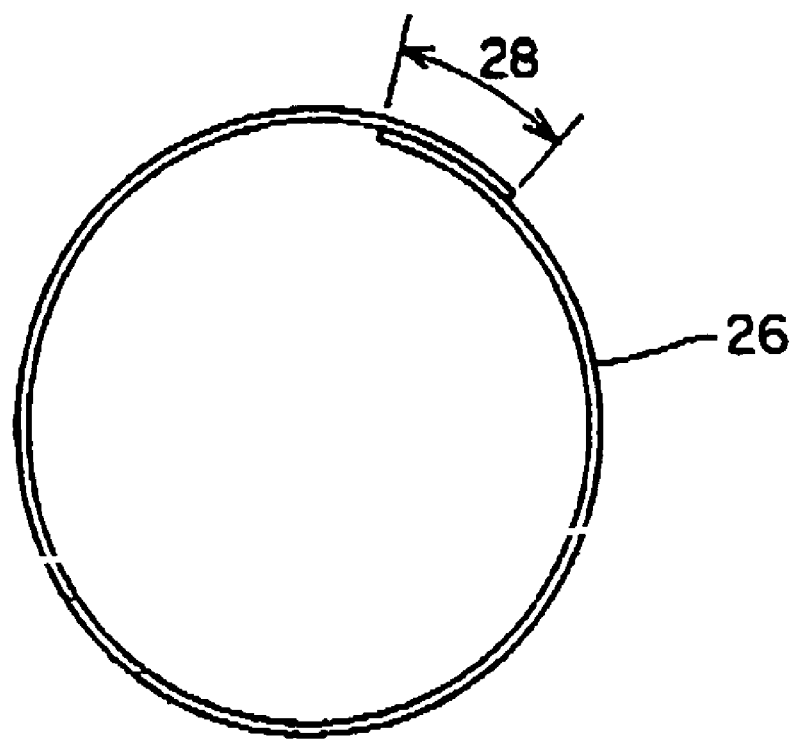
FIG. 6 is a side plane view illustrating the cylindrical body formed from the plate of FIG. 5.

Each cylindrical filter 25, as shown in FIG. 5 and FIG. 6, includes a cylindrical body 26 which is formed from a plate with a plural of perforations and is rolled to form a cylindrical shape, and a snap ring 27 which is made of spring steel. It is preferred that the perforations formed in the cylindrical body 26 is etched in a thin plate of aluminum base alloy, copper or stainless steel. The cylindrical body 26 is also formed made of meshed sheet resin material instead of metal material. In the cylindrical body 26, an overlapping portion 28 of side edges of the plate with the perforations rolled in cylindrical shape is overlapped within minimum area in order to reduce pressure loss. It is preferred that the length of overlapping portion is approximately 3 mm.

Figure 3:
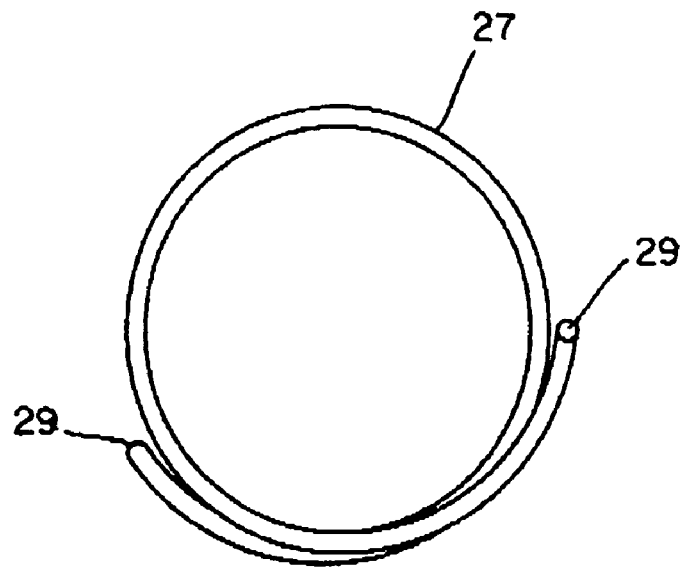
FIG. 3 is a front plane view illustrating a snap ring provided in the control valve.
Figure 4:
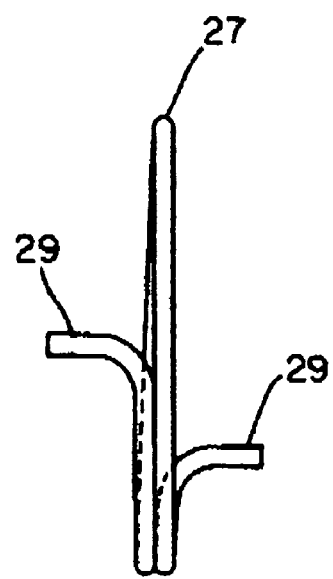
FIG. 4 is a side plane view illustrating the snap ring of FIG. 3.

The snap ring 27, as shown in FIG. 3 and FIG. 4, is formed from a thin bar bent into a single loop around an outer periphery of the filter in a circumferential direction and with overlapping portions, and both ends 29 of the bar are extended oppositely along an axial direction of the snap ring 27. The both ends 29 contact or approximately contact with a pair of side surfaces of the outer periphery of the filter defining one of the groove portions 9, 10 and 11 in order to minimize vibration.

Since the snap ring 27 formed into the single loop generates resistance against flow of fluid, it is effective to prevent pressure loss.

As shown in FIG. 1, a side edge of the cylindrical body 26 is disposed in the step portions 22, 23 and 24. Under the condition, the bottom portions of the groove portions 9, 10 and 11 generate spaces between each port 12, 13 and 14 and the cylindrical body 26. As the result, the fluid smoothly flows between the groove portions 9, 10 and 11 and the ports 12, 13 and 14.

The cylindrical body 26 is seated on each step portion 22, 23 and 24, and the snap ring 27 is widened, then the snap ring 27 is fitted into a central portion of the cylindrical body 26 from an outer periphery of the valve body 4. Therefore the snap ring 27 prevents the cylindrical body 26 from departing from the groove portions 9, 10 and 11. The both ends 29 of the snap ring 27 contact with the side face of the groove portions 9, 10 and 11. Consequently, the single loop portion of the snap ring 27 is always placed in an approximately middle of the groove portions 9, 10 and 11 in width direction.

The snap ring 27 is formed into a single loop from the thin bar, but the inner diameter of the snap ring 27 does not entirely contact with the cylindrical body 26. It is preferable that a curvature of the snap ring 27 is adjusted in order to contact with the cylindrical body 26 at least at two points separated from each other.

Applying the snap ring 27 prevents the cylindrical body 26 from widening, deforming and departing from the groove portion, even if the direction of fluid flow from the inlet and outlet ports 6,7 and 8 is shifted.

It is also preferable that the cylindrical body is made of net member.

According to the present invention, the cylindrical body is formed from the plate with perforations and is rolled to form a cylindrical shape. As compared with a conventional invention, molding tool is unnecessary. The snap ring is fitted to the cylindrical body by widening so that the man hour of manufacturing and assembly can be reduced. Applying the cylindrical body and the snap ring can reduce pressure loss of the fluid flow and prevent the cylindrical body from widening. In addition, the filter performance is improved.

The principles, a preferred embodiment and mode of operation of the present invention have been described in the foregoing specification and drawings. However, the invention which is intended to be protected is not to be construed as limited to the particular embodiment disclosed. Further, the embodiments described herein are to be regarded as illustrative rather than restrictive. Plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A fluid control valve comprising:
    a valve body;
    an annular groove portion formed in an outer periphery of the valve body; and
    a filter provided in the groove portion, the filter including a plate with a plurality of perforations and formed into a cylindrical shape, the filter being fastened to the groove portion by winding a snap ring formed from a thin bar bent into a loop around an outer periphery of the filter in a circumferential direction,
    wherein one end of the snap ring extends along an axial direction of the snap ring toward one of opposite side surfaces of the outer periphery of the filter defining the groove portion, and other end of the snap ring extends along an axial direction of the snap ring toward other of the opposed side surfaces.

2. A fluid control valve according to claim 1, wherein each of said ends of the snap ring contacts with a respective one of said opposed side surfaces.

3. A fluid control valve according to claim 1 comprising:
    each opposed side surface defining the groove portion being provided with a step portion, wherein a side edge of the cylindrical body is placed in the step portion.

4. A fluid control valve according to claim 2, wherein a curvature of the snap ring is defended by two points of the cylindrical body contacting with the inner diameter of the snap ring.

5. A fluid control valve according to claim 1 comprising;
    a spool provided in a central hole of the valve body, wherein the spool slidably moves in an axial direction by an electromagnet and the groove portion of the valve body freely communicates with an oil passage of the spool via a port in radial direction of the valve body.

6. A fluid control valve according to claim 1 comprising;
    an outer surface of the valve body contacting with inner surface of the central hole of a housing, wherein an inlet port or an outlet port formed in the housing communicates with the groove portion of the valve body.

7. A fluid control valve according to claim 1, wherein the snap ring is formed from the thin bar bent into the single loop with overlapping portions.

* * * * *